US012615139B2

(12) United States Patent (10) Patent No.: US 12,615,139 B2

Comin (45) Date of Patent: Apr. 28, 2026

(54) QKD TERMINAL, QKD SYSTEM AND METHOD FOR QUANTUM COMMUNICATION

(71) Applicant: Airbus SAS, Blagnac (FR)

(72) Inventor: Alberto Comin, Blagnac (FR)

(73) Assignee: Airbus SAS, Blagnac (FR)

( * ) Notice: Subject to any disclaimer, the term of this patent is extended or adjusted under 35 U.S.C. 154(b) by 125 days.

(21) Appl. No.: 18/529,304

(22) Filed: Dec. 5, 2023

(65) Prior Publication Data

US 2024/0204994 A1 Jun. 20, 2024

(30) Foreign Application Priority Data

Dec. 16, 2022 (EP) ..................................... 22214399

(51) Int. Cl.
*H04L 9/08* (2006.01)
(52) U.S. Cl.
CPC .................................. *H04L 9/0852* (2013.01)
(58) Field of Classification Search
CPC ... H04L 9/0852; H04L 9/0855; H04L 9/0858; H04L 9/0819; H04B 10/70
See application file for complete search history.

(56) References Cited

U.S. PATENT DOCUMENTS

| | | | | |
|---|---|---|---|---|
| 6,897,434 B1 * | 5/2005 | Kumar | ................... | H04B 10/70 |
| | | | | 359/341.1 |
| 8,717,666 B2 * | 5/2014 | Nguyen | .................... | G02F 1/39 |
| | | | | 372/21 |
| 8,983,303 B2 * | 3/2015 | Meyers | .................. | H04B 10/11 |
| | | | | 398/140 |
| 9,374,376 B2 * | 6/2016 | Hunt | ...................... | H04B 10/70 |
| 11,170,318 B2 * | 11/2021 | Ashrafi | ..................... | G02F 3/00 |
| 2021/0119786 A1 * | 4/2021 | Bucklew | .............. | H04L 9/0852 |
| 2021/0142205 A1 * | 5/2021 | Ashrafi | .................. | H04L 9/085 |
| 2022/0158728 A1 | 5/2022 | Steinlechner et al. | | |
| 2024/0322916 A1 * | 9/2024 | Sangle-Ferriere | ..... | H04B 10/70 |

FOREIGN PATENT DOCUMENTS

EP 4002723 A1 5/2022

OTHER PUBLICATIONS

European Search Report for corresponding European Patent Application No. 22214399 dated May 31, 2023; priority document.
X. Huang, et al., "Metasurface Holographic Optical Traps for Ultracold Atoms" ARXIV.org, Cornell University Library, Ithaca, NY, Oct. 14, 2022.

* cited by examiner

*Primary Examiner* — Hosuk Song
(74) *Attorney, Agent, or Firm* — Greer Burns & Crain Ltd.

(57) ABSTRACT

A QKD terminal for entangled photon Quantum Key Distribution, including: a photon source configured to emit a pair of entangled photons on a QKD channel, a dynamic holographic device arranged downstream of the photon source on the QKD channel and configured to receive and redirect the pair of entangled photons; and a controller connected to the holographic device and configured to trigger the holographic device to redirect a first entangled photon of the pair of entangled photons to a first direction and a second entangled photon of the pair of entangled photons to a second direction different from the first direction. A QKD system and a method for quantum communication are also provided.

17 Claims, 8 Drawing Sheets

S1

S2

S3

QKD TERMINAL, QKD SYSTEM AND METHOD FOR QUANTUM COMMUNICATION

CROSS-REFERENCES TO RELATED APPLICATIONS

This application claims the benefit of the European patent application No. 22214399.2 filed on Dec. 16, 2022, the entire disclosures of which are incorporated herein by way of reference.

FIELD OF THE INVENTION

The present invention is directed to a QKD terminal, a QKD system and a method for quantum communication.

BACKGROUND OF THE INVENTION

Entanglement-based Quantum Key Distribution (QKD) provides secure communication between, for example, airborne and/or ground vehicles. In such link, a third vehicle, positioned between the two communication partners, hosts an entangled photon source that provides a secret key to communication parties. In a scenario, an airborne vehicle carrying an entangled photon source, can distribute entangled photon pairs between the two ground vehicles establishing a shared encryption key between them.

A typical approach on airborne or spaceborne platforms hosting an entangled QKD source is to provide separate telescopes for sending each photon of the entangled photon pairs in different directions, towards the two communication parties. For these systems, there is a need to provide an improved terminal.

SUMMARY OF THE INVENTION

According to a first aspect of the invention, a QKD terminal for quantum communication is provided. The QKD terminal comprises: a photon source configured to emit a pair of entangled photons on a QKD channel, a dynamic holographic device arranged downstream of the photon source on the QKD channel and configured to receive and redirect the pair of entangled photons; and a controller connected to the holographic device and configured to trigger the holographic device to redirect a first entangled photon of the pair of entangled photons to a first direction and a second entangled photon of the pair of entangled photons to a second direction different from the first direction.

According to a second aspect of the invention, a QKD system for quantum communication is provided. The QKD system comprises an inventive QKD terminal, a first optical receiver and a second optical receiver, wherein the controller is configured to trigger the holographic device to redirect the first entangled photon to the first optical receiver and the second entangled photon to the second optical receiver.

According to a third aspect of the invention, a method for quantum communication is provided. The method comprises generating, by an entangled photon source, a pair of entangled photons; directing the pair of entangled photons to a dynamic holographic device; and triggering, by a controller, the dynamic holographic device to redirect a first entangled photon of the pair of entangled photons to a first direction and the second entangled photon of the pair of entangled photons to a second direction different from the first direction.

A fundamental concept of the invention is to send the pair of entangled photons through a single aperture toward two different receivers. For this, a steering element is required that is capable to split the pair of entangled photons and deflect these in two different directions. This steering element suitable for this function has been identified as the dynamic holographic device.

As within this invention, the dynamic holographic device should be understood in the following way. The feature of being dynamic enables the dynamic holographic device to direct the entangled photons onto moving receivers such as moving particles. For this, the dynamic holographic device applies a phase shift across the incident wavefront according to the direction such that the entangled photons are deflected. The dynamic holographic device also has the capability of shaping both the amplitude and the phase of the electric field. This is beneficial for minimizing side-lobes and in general for shaping the wavefronts of the two output beams. This may be performed for a reflective type dynamic holographic device by modifying, e.g., locally raising or lowering, a deflecting surface of the dynamic holographic device, or for a transmissive dynamic type holographic device by changing a refractive index of the internal medium the entangled photon is propagating. In both cases, a certain pitch- and/or grating-like modification similar to a phased array is applied to the surface or the internal medium.

A particular advantage in the solution according to an aspect of the invention is the compactness of the dynamic holographic device that basically substitutes and eliminates an entire aperture including a telescope. Furthermore, since the entangled photons are steered in a non-mechanical way, the present invention renders a mechanical coarse steering system obsolete, which makes the terminal more robust to environmental factors, such as wind or vibrations.

The dynamic holographic device is positioned downstream of the entangled photon source, which emits a stream of entangled photons downstream of the QKD channel to the holographic device positioned. As within this invention, the QKD channel should be understood as the optical path of the entangled photons, which starts with the generation and emission of the pair of photons in the entangled photon source at the QKD terminal. Therefore, all further devices arranged on the QKD channel are arranged downstream of the entangled photon source.

Advantageous embodiments and further developments emerge from the description with reference to the figures.

According to some further aspects of the QKD terminal according to the invention, the dynamic holographic device is configured as a tunable meta surface, a liquid crystal spatial light modulator, and/or a digital hologram. These devices are particularly well developed and suitable for functioning as the dynamic holographic device. Further devices forming the dynamic holographic device by a similar principle are thinkable.

According to some further aspects of the QKD terminal according to the invention, the dynamic holographic device comprises a first meta surface and a second meta surface downstream of the first meta surface in the QKD channel, wherein the first meta surface is configured as a grating for splitting an incident beam into a first beam and a second beam, wherein the second meta surface is configured as a beam steering element, wherein the controller is configured to trigger the second meta surface to redirect the first entangled photon to the first direction and the second entangled photon to the second direction. Using a sequence of two or even more flat optics, the functions of splitting the pair of entangled photons and steering the entangled photons is separated. In this way, the first and second meta surface may be selected according to the optimum suitability for the specific functions. The dynamic holographic device may thus be implemented in a simpler way.

According to some further aspects of the QKD terminal according to the invention, the first meta surface and the second meta surface are mounted on a rotational stage configured to rotate about an azimuthal direction. The azimuthal direction is the direction around the orthogonal or normal direction from a surface of the dynamic holographic device. The second meta surface is configured as a one-dimensional beam steering element. Thus, a degree of freedom of the beam steering has been removed, so that the first meta surface and the second meta surface only need to operate along a single axis.

According to some further aspects of the QKD terminal according to the invention, the first meta surface and the second meta surface are formed on a substrate. The substrate is configured as a base layer of the respective meta surface. The controller is configured to trigger the first meta surface and/or the second meta surface to deflect the first entangled photon and the second entangled photon by stretching the substrate. This is a simple way to tune the meta surface in order to split and/or steer the entangled photons.

According to some further aspects of the QKD terminal according to the invention, the second meta surface is formed on a thermo-optical substrate. The controller is configured to deflect the first entangled photon and the second entangled photon by applying a temperature to the thermo-optical substrate. This could be performed in case the substrate has a temperature-dependent refractive index. This aspect thus provides another simple way to tune the meta surface in order to split and/or steer the entangled photons.

According to some further aspects of the QKD terminal according to the invention, the QKD terminal further comprises a pointing system comprising a deflecting element arranged downstream of the entangled photon source and configured to deflect the pair of entangled photons, and a beacon detector configured to sense an angle of arrival of a beacon light incident to the QKD terminal, wherein the controller is configured to control a tilt of the deflecting element based on the sensed angle of arrival of the beacon light. By analyzing the beacon light coming from the receiver, information about the direction of the receiver can be obtained. By suitably addressing the tilt of the deflecting element according to this information, the pointing of the entangled photons in the QKD channel toward a receiver is stabilized.

According to some further aspects of the QKD terminal according to the invention, the beacon detector comprises a first photodetector configured to sense a first beacon light having a first wavelength, and a second detector configured to sense a second beacon light having a second wavelength. In this way, two beacons having two different wavelengths and coming from different directions can be analyzed. The pointing of the entangled photons in the QKD channel can be stabilized by correspondingly addressing the tilt of the deflecting element.

According to some further aspects of the QKD terminal according to the invention, wherein the entangled photon source is implemented on an integrated photonic circuit. In this way, a very compact device particularly suitable for an airborne or spaceborne vehicle can be realized.

According to some further aspects of the QKD terminal according to the invention, the QKD terminal further comprises a light source arranged and configured to emit an output signal on a communication channel, and a detector arranged and configured to receive an input signal of the optical communication channel, wherein the dynamic holographic device is arranged on the communication channel downstream of the light source and the detector. In this way, the QKD terminal can also function as an intermediate communication node, to extend an optical communication network between different optical receivers.

According to some further aspects of the QKD terminal according to the invention, the QKD terminal further comprises a fiber optical circuit arranged and configured to couple the pair of entangled photons, the input signal and output signal into the fiber optical circuit, wherein the fiber optical circuit comprises a multiplexer configured to combine the output signal with the entangled photons. In this way, the terminal can be made more compact and robust against vibrations or other environmental influences.

According to some further aspects of the QKD terminal according to the invention, the fiber optical circuit comprises an optical circulator arranged and configured to receive the input signal and the output signal and direct the input signal to the detector and the output signal to the multiplexer. The optical circulator is a fiber device that here has the benefit to allow signals propagating in opposite directions through the same fiber. Therefore, the optical circulator improves the compactness of the device.

According to some further aspects of the QKD system according to the invention, at least one of the first optical receiver and the second optical receiver is mounted on a moving vehicle, and/or wherein the QKD terminal is mounted on an unmanned air vehicle or a satellite. This aspect represents the versatile application of the present invention.

According to some further aspects of the QKD system according to the invention, the first optical receiver and/or second optical receiver comprises a wavefront sensor configured to measure the wavefront of the communication beam, and an adaptive optical element configured to manipulate a wavefront of the received entangled photon, wherein the receiver control circuit is configured to correct the wavefront of the entangled photons by controlling the adaptive optical element. In this way, the communication channel can be used to analyze the atmospheric turbulences and correspondingly correct the wavefront for both, the communication beams and the entangled photon. Since this improves the focus of the entangled photon onto the photon counter at the receiver, this aspect results in a higher key-rate.

BRIEF DESCRIPTION OF THE DRAWINGS

The present invention is explained in more detail below with reference to the embodiments shown in the schematic figures.

Figure 1:
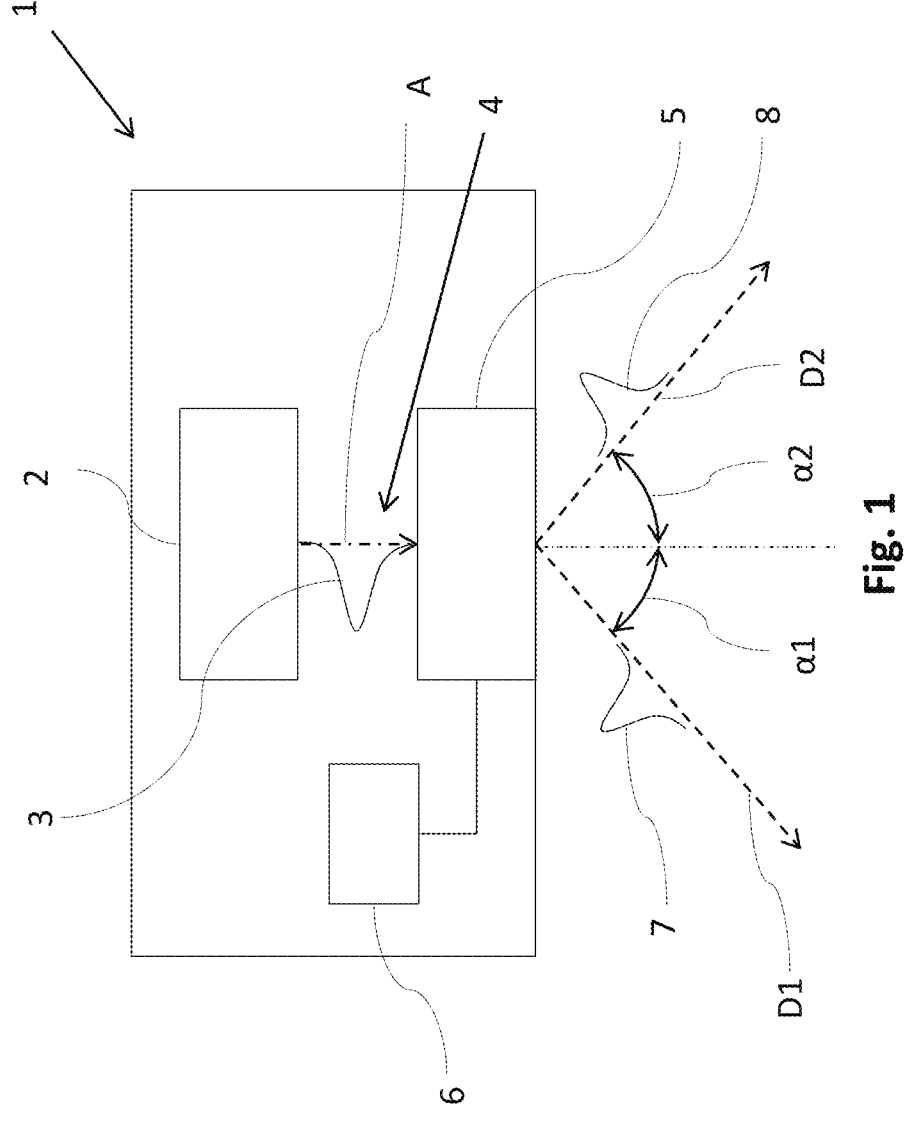
FIG. 1 shows a schematic illustration of a QKD terminal for quantum communication according to an embodiment of the invention.

In the figures of the drawing, elements, features and components which are identical, functionally identical and of identical action are denoted in each case by the same reference designations unless stated otherwise.

DETAILED DESCRIPTION OF THE PREFERRED EMBODIMENTS

FIG. 1 shows a schematic illustration of a QKD terminal 1 for quantum communication according to an embodiment of the invention.

The QKD terminal 1 for quantum communication shown in FIG. 1 comprises a photon source 2 configured to emit a pair of entangled photons 3 on a QKD channel 4. Such entangled photon sources 3 may emit entangled photons of the same wavelength, e.g., 1550 nm, or different wavelengths. The pair of entangled photons 3 are emitted on the QKD channel 4 on the same optical axis A, i.e., in the same direction. It is understood that the entangled photon source 2 is typically configured to emit a stream of entangled photons having a certain repetition rate, e.g., between 100 Hz and 100 Mhz.

The QKD terminal 1 further comprises a dynamic holographic device 5 arranged downstream of the photon source 2 on the QKD channel 4 and configured to receive and redirect the pair of entangled photons 3. In this embodiment, the dynamic holographic device 5 is configured as a tunable meta surface. In further embodiments, the dynamic holographic device 5 is configured as a liquid crystal spatial light modulator and a digital hologram. In this embodiment, the dynamic holographic device 5 as the final optical element downstream of the QKD channel 4 inside the QKD terminal 1. In further embodiment, a window, a telescope or other optical elements may be arranged downstream of the dynamic holographic device 5 inside the QKD terminal 1.

The QKD terminal 1 further comprises a controller 6, which is connected to the holographic device 5. The controller 6 is configured to trigger the holographic device 5 to redirect a first entangled photon 7 of the pair of entangled photons 3 to a first direction D1 and a second entangled photon 8 of the pair of entangled photons 3 to a second direction D2 different from the first direction D1. The pair of photons 3 thus is split into the first entangled photon 7 propagating in the first direction D1 and the second entangled photon 8 propagating in the second direction D2. The dynamic holographic device 5 thus deflects the first entangled photon 7 by a first deflection angle α1 and the second entangled photon 8 by a deflection angle α2. The first and second deflection angles α1, α2 may be of similar with respect to the original optical axis A and respective first direction D1 and second direction D2 or they may be different.

In further embodiments, the controller 6 is also connected to the entangled photon source 2 and configured to control parameter, such as, e.g., the repetition rate.

Figure 2:
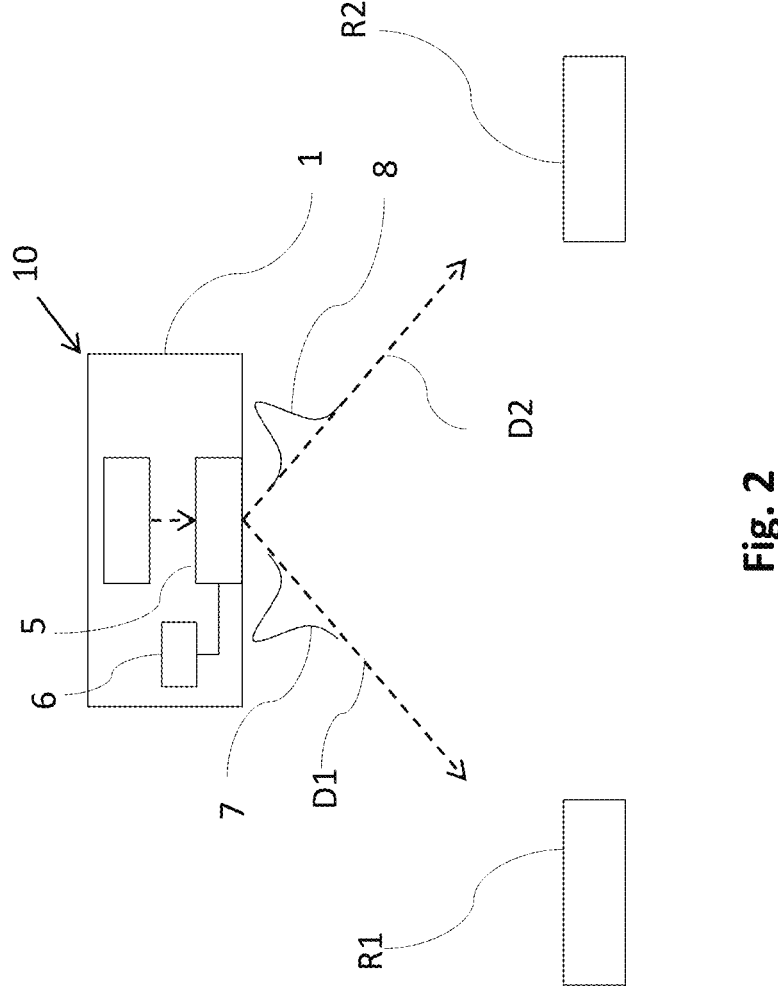
FIG. 2 shows a schematic illustration of a QKD system for quantum communication according to an embodiment of the invention.

FIG. 2 shows a schematic illustration of a QKD system 10 for quantum communication according to an embodiment of the invention.

The QKD system 10 for quantum communication shown in FIG. 2 comprises a QKD terminal 1 according to the previous FIG. 1 or any other embodiment of the invention. A first optical receiver R1 and a second optical receiver R2 are arranged distant from the QKD terminal 1. The controller 6 is configured to trigger the holographic device 5 to redirect the first entangled photon 7 to the first optical receiver R1 and the second entangled photon 8 to the second optical receiver R2. The receivers R1 and R2 receive the respective first and second entangled photons 7, 8, which provide a key for encrypting the data of a classical communication channel (not shown in FIG. 2).

Figure 3:
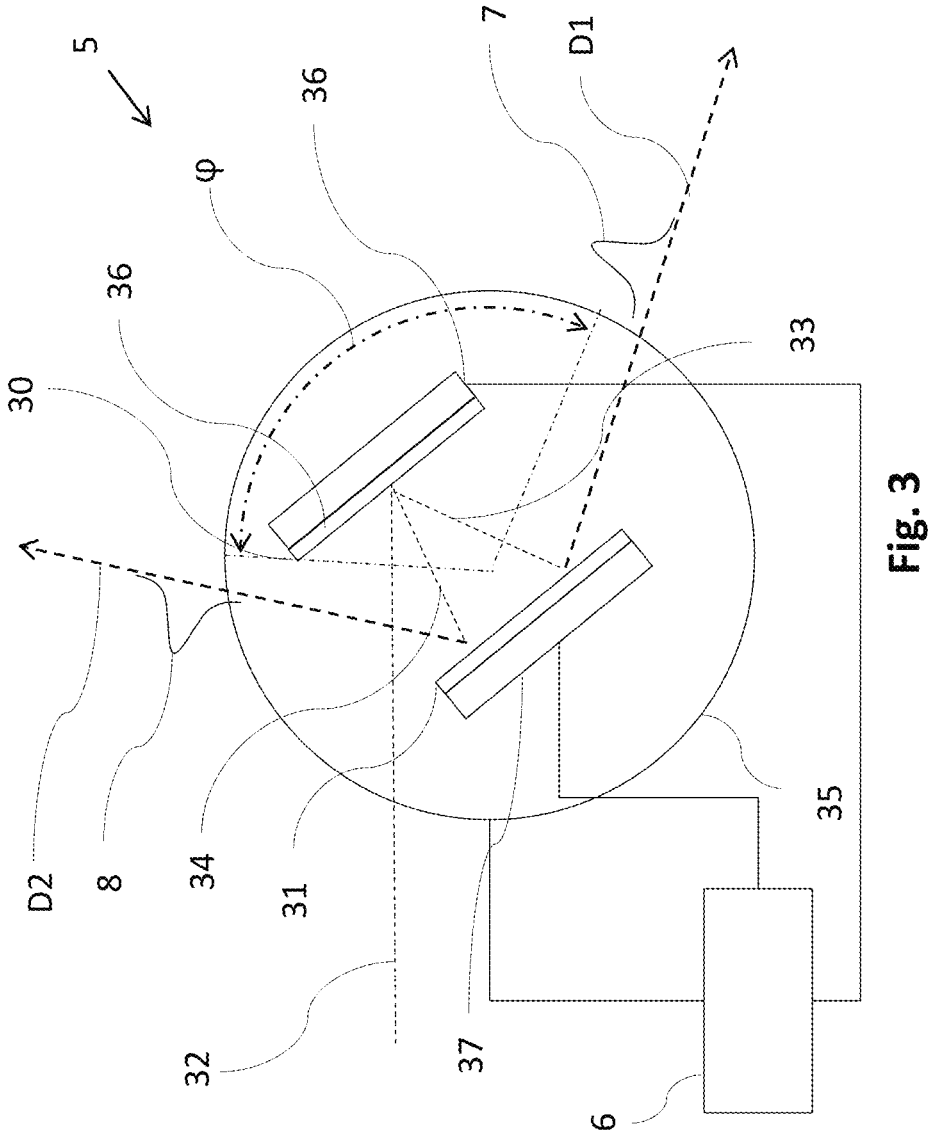
FIG. 3 shows a schematic illustration of a dynamic holographic device for quantum communication according to a further embodiment of the invention.

FIG. 3 shows a schematic illustration of a dynamic holographic device 5 according to an embodiment of the invention;

The dynamic holographic device 5 shown in FIG. 3 represents a particular embodiment of the dynamic holographic device 5 and can be applied to the QKD terminal 1 of the embodiments of this invention. The dynamic holographic device 5 comprises a first meta surface 30 and a second meta surface 31 downstream of the first meta surface 30 in the QKD channel 4. The first meta surface 30 is configured as a grating for splitting an incident beam 32 into a first beam 33 and a second beam 34, wherein the second meta surface 31 is configured as a beam steering element. The controller 6 is configured to trigger the second meta surface 31 to redirect the first entangled photon 7 to the first direction D1 and the second entangled photon 8 to the second direction D2.

In this embodiment, the first meta surface 30 and the second meta surface 31 are mounted on an optional rotational stage 35, which is configured to rotate about an azimuthal direction q. Due to this rotation, one degree of freedom for steering the entangled photons 7, 8 is removed. Therefore, the second meta surface 31 is configured as a one-dimensional beam steering element, since this is sufficient. It is understood that in the setup shown in FIG. 3, that the first and second directions D1, D2 point out of the drawing plane, which is not shown for simplicity of the figure.

Furthermore, the first meta surface 30 and the second meta surface 31 are formed on respective substrates 36, 37. The controller 6 is configured to trigger the first meta surface 30 to deflect the first entangled photon 7 by mechanical stretching the substrate. This can be performed using actuators (not shown here) that pull or push the substrate 36. Any suitable, e.g., piezo-based, mechanism or devices may be used for this function.

In this embodiment, the second meta surface 32 comprises a thermo-optical substrate 37. For the second meta surface, the controller 6 is configured to deflect the first entangled photon 7 and the second entangled photon 8 by applying a temperature to the substrate 37.

Figure 4:
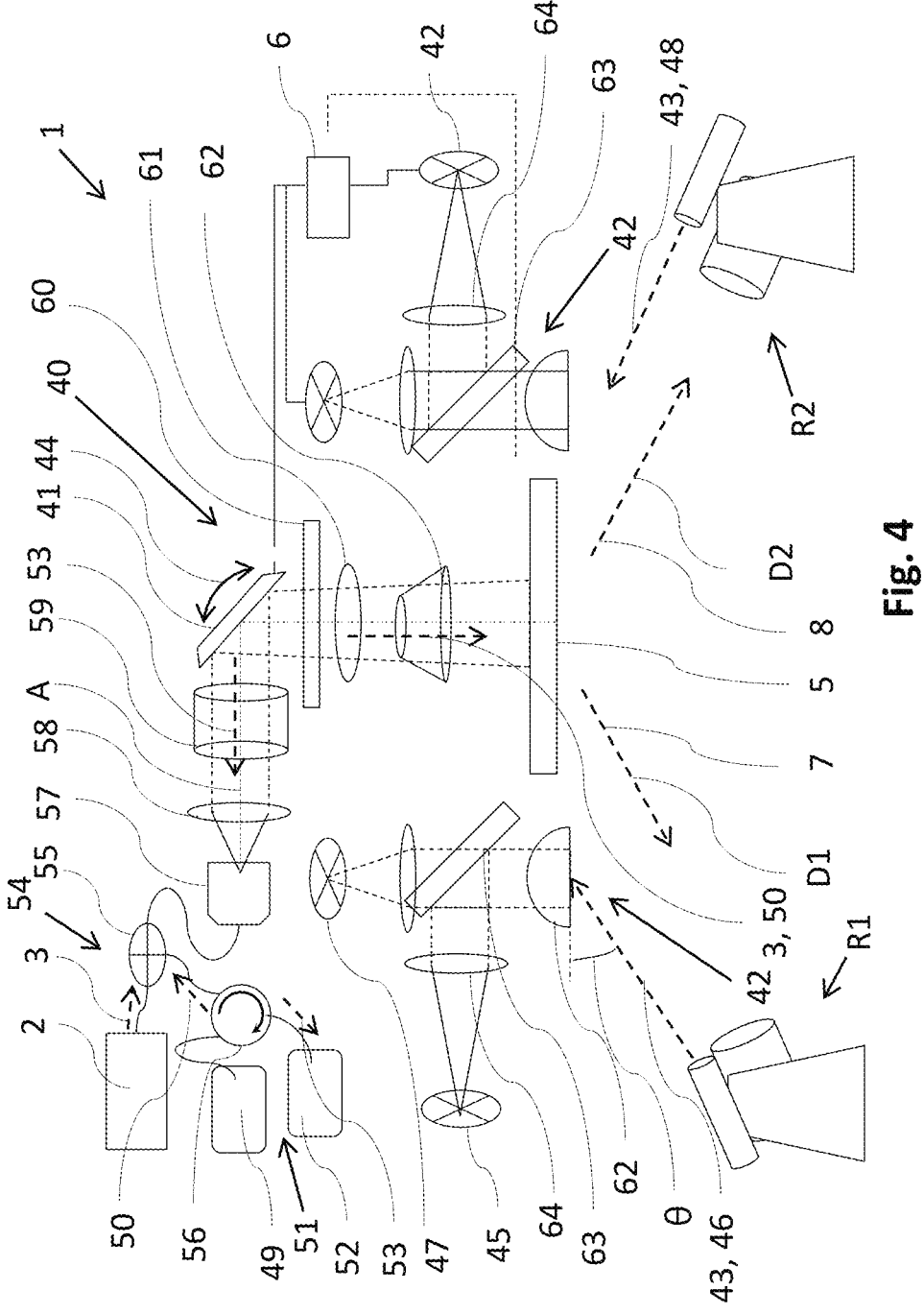
FIG. 4 shows a schematic illustration of a QKD system for quantum communication according to a further embodiment of the invention.

FIG. 4 shows a schematic illustration of a QKD system 10 for quantum communication according to a further embodiment of the invention.

The QKD terminal 1 of the QKD system 10 shown in FIG. 4 is based on the QKD terminal 1 in FIG. 1, however, having additional elements and functions.

The QKD terminal 1 for quantum communication shown in FIG. 4 comprises a photon source 2 configured to emit a pair of entangled photons 3 on a QKD channel 4. The pair of entangled photons 3 are emitted on the QKD channel 4 in the same direction.

The QKD terminal 1 further comprises a dynamic holographic device 5 arranged downstream of the photon source 2 on the QKD channel 4 and configured to receive and redirect the pair of entangled photons 3. In this embodiment, the dynamic holographic device 5 is configured as a tunable meta surface. In further embodiments, the dynamic holographic device 5 is configured as a liquid crystal spatial light modulator and a digital hologram.

The QKD terminal 1 further comprises a controller 6, which is connected to the holographic device 5. The controller 6 is configured to trigger the holographic device 5 to redirect a first entangled photon 7 of the pair of entangled photons 3 to a first direction D1 and a second entangled photon 8 of the pair of entangled photons 3 to a second direction D2 different from the first direction D1. The pair of photons 3 thus is split into the first entangled photon 7 propagating in the first direction D1 and the second entangled photon 8 propagating in the second direction D2.

In this embodiment, the pair of entangled photons 3 are coupled into a fiber optical circuit 54. Fibers used for the fiber optical circuit 54 are single mode fibers. In further embodiments, few-modes or multi-mode fibers are applied. The entangled photons 3 then pass a multiplexer 55, wherein the entangled photons are combined with an output signal 50. The multiplexer 55 is configured as a wavelength multiplexer. In further embodiments, the multiplexer 55 may be configured as a spatial mode multiplexer. The output signal 50 is emitted by a light source 49 upstream of the multiplexer 55. The pair of entangled photons 3 further passes through the fiber optic circuit 54 and exits the fiber optical circuit 54 at the fiber collimator 57, from where it propagates to a lens 58 to propagate along the optical axis A in free-space. It then passes relay lenses 59 and intersects with a deflecting element 41, which is configured as a fast steering mirror. The relay lenses 59 have the function to map a pupil on the deflecting element.

The deflecting element 41 is part of a pointing system 40 comprising the deflecting element 41 arranged downstream of the entangled photon source 2 and configured to deflect the pair of entangled photons 3. The pair of entangled photons 3 then passes a dichroic filter 60, a lens for divergence adjustment 62 and a beam expander 61 to be incident on the dynamic holographic device 5. There, the pair of entangled photons 3 is split into the first entangled photon 7 and the second entangled photon 8, which are redirected into the first direction D1 and the second direction D2 towards respective receivers R1 and R2.

The pointing system 40 further comprises a beacon detector 42 configured to sense an angle of arrival θ of a beacon light incident 43 incident on the QKD terminal 1. For this, a wide-angle lens 62 having a high NA, e.g., >1, is arranged as a receiver aperture. In further embodiments, the wide-angle lens 62 is configured as a fish-eye lens. The beacon light then propagates onto a dichroic beam splitter 63, where first beacon light 46 can be separated from a second beacon light 48 having different wavelength than the first beacon light 46. Each of the beacon lights 46 and 48 propagates through a focusing lens 64, which effectively converts an angle into a displacement in the focal plane of the focusing lens 64. In the focal plane, a first photodetector 45 and a second photodetector 47 are arranged. Both first and second photodetectors 45, 47 are configured as position-sensitive photodetectors. With this setup, the first photodetector 45 is thus configured to sense an angle of arrival θ of the first beacon light 46 having the first wavelength, and the second detector 47 is configured to sense an angle of arrival θ of a second beacon light 48 having a second wavelength.

The position of the intensity spot on the first and second photodetectors 45, 47 is read out by the controller 6. The controller 6 is configured to control a tilt 44 of the deflecting element 41 based on the position of the intensity spot on the photodetectors 45, 47, which indicates the sensed angle of arrival θ of the beacon light 43.

The light source 49 is arranged and configured to emit the output signal 50 on a communication channel 51. A corresponding detector 52 is arranged and configured to receive an input signal 53 propagating on the optical communication channel 51. The fiber optical circuit 54 comprises an optical circulator 56 arranged and configured to receive the input signal 53 and the output signal 50 and direct the input signal 53 to the detector 52 and the output signal 50 to the multiplexer 55.

Both the input signal 53 and the output signal 50 couple/decouple from/to the fiber optical circuit 54 through the fiber collimator 57 to/from where it propagates along the optical axis A to the dynamic holographic device 5. The dynamic holographic device 5 deflects the input signal 53 and output signal 50 in a similar way as the entangled photons 7, 8 to/from the first and second receivers R1, R2.

In FIG. 4, two beacon detectors 42 with respective components are shown. The number of two beacon detectors 42 instead of one has been implemented for better redundancy and may also be used in case more than two beacon lights 43 having mutually different wavelengths are incident on the QKD terminal 1. A tilt of the deflecting element 41 as a fine steering mirror is thus based on an average of the measured positions on both the first photodetectors 45 or the second photodetectors 47.

In this embodiment, the entangled photon source 2 is implemented on an integrated photonic circuit. In further embodiments, the entire fiber optical circuit 54 is implemented on an integrated photonic circuit. In particular, the fiber optical circuit 54 can also implemented as an integrated photonics circuit. Furthermore, the entangled photon source 2 and the optical circuit 54 can be parts of the same integrated circuit.

Figure 5:
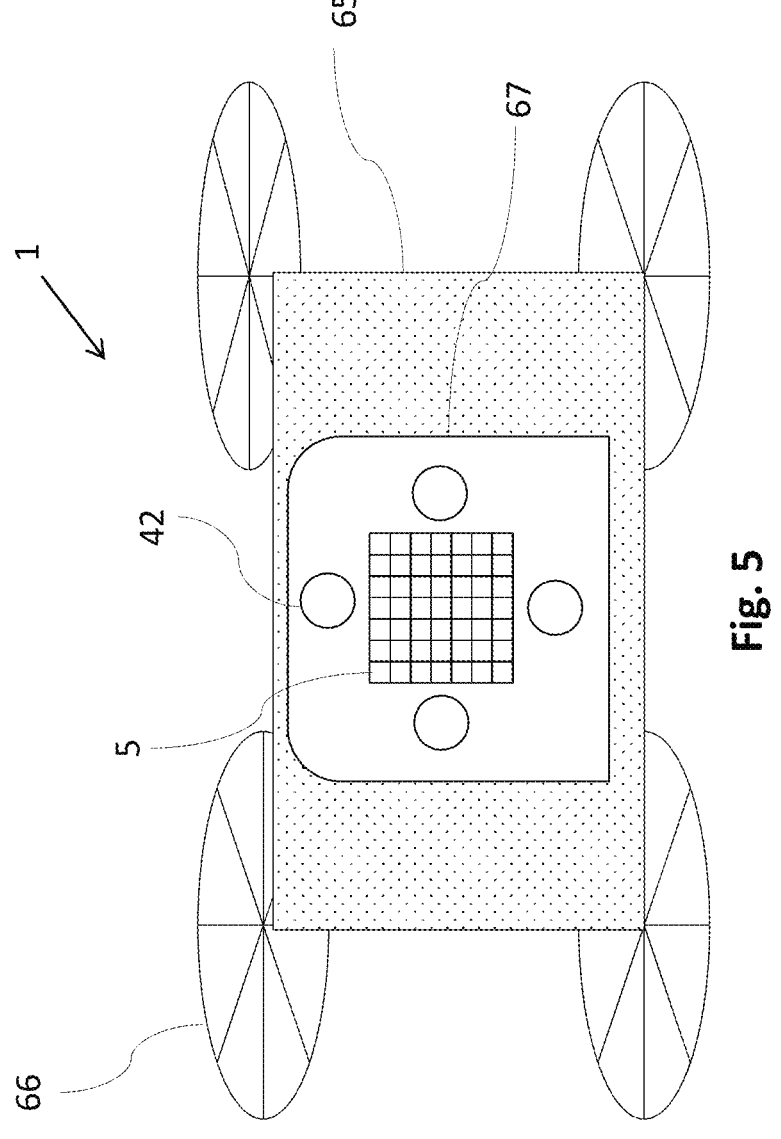
FIG. 5 shows a schematic illustration of a QKD terminal for quantum communication according to a further embodiment of the invention.

FIG. 5 shows a schematic illustration of a QKD terminal 1 for quantum communication according to a further embodiment of the invention.

In this embodiment, the QKD terminal 1 is mounted on a drone 65 having four rotors 66. FIG. 5 shows the bottom side 67 of the QKD terminal 1. The dynamic holographic device 5 is arranged in the center of the bottom surface 67. Arranged around the dynamic holographic device 5 are four beacon detectors 42 for even more redundancy and being capable of detecting beacon light 43 incident from all directions. The four beacon detectors 42 may also be used to discriminate incident beacons having multiple mutually different wavelengths coming from multiple directions.

Figure 6:
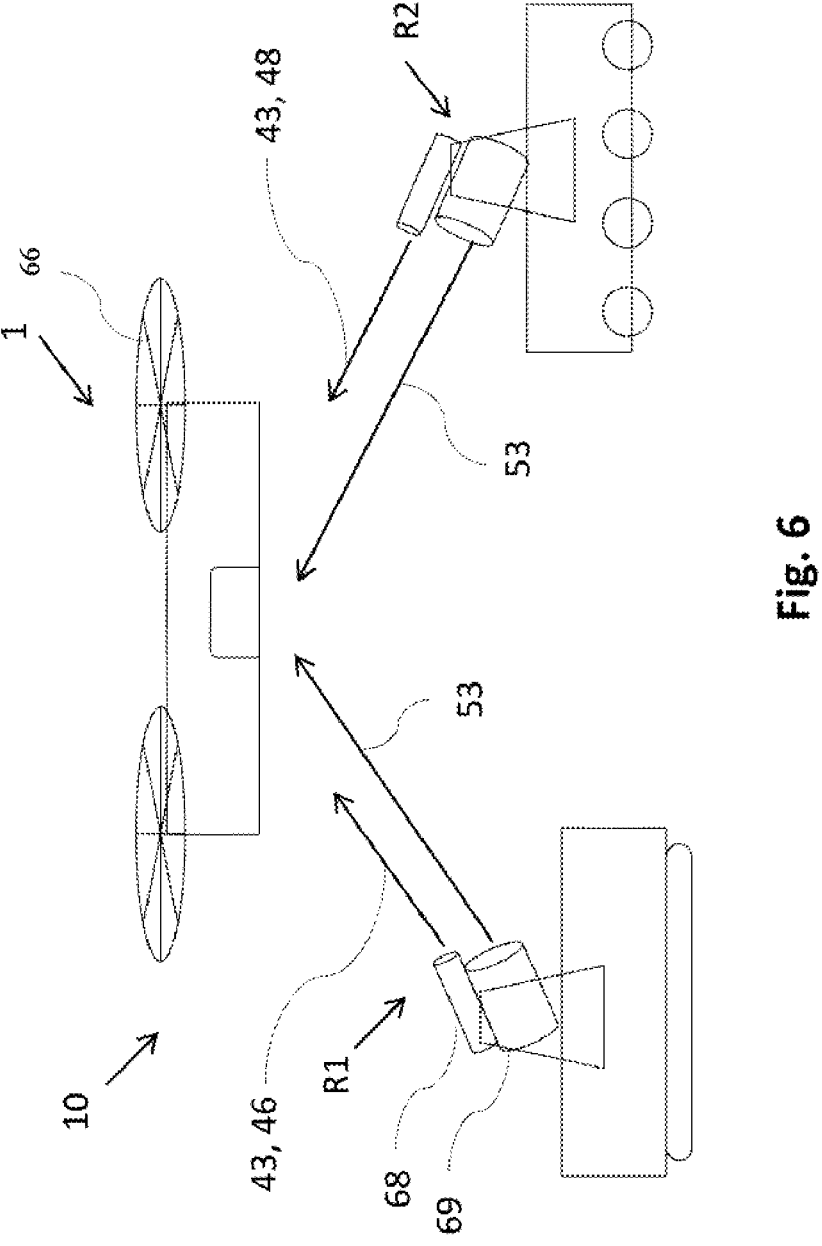
FIG. 6 shows a schematic illustration of a QKD system for quantum communication according to a further embodiment of the invention.

FIG. 6 shows a schematic illustration of a QKD system 10 for quantum communication according to a further embodiment of the invention.

In this embodiment of the QKD system 10, the first optical receiver is stationary, and the second optical receiver R2 is mounted on a moving vehicle. The QKD terminal 1 is mounted on an unmanned air vehicle. Each of the receivers R1, R2 comprises a beacon aperture 68, from which the beacon light 43 is emitted, and a communication-link aperture 69, from which the input signal 53 is emitted.

Figure 7:
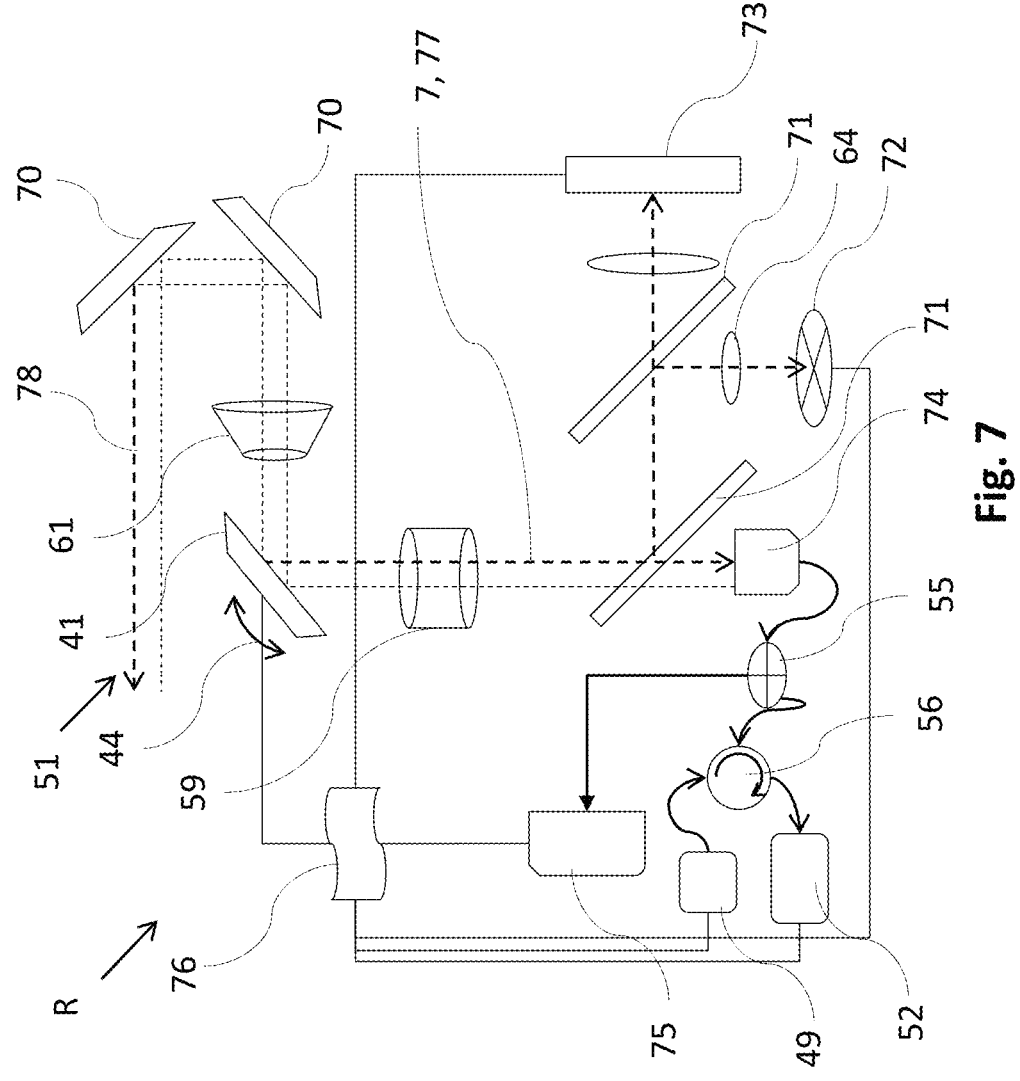
FIG. 7 shows a schematic illustration of an optical receiver of a QKD system for quantum communication according to a further embodiment of the invention.

FIG. 7 shows a schematic illustration of an optical receiver R of a QKD system 10 for quantum communication according to a further embodiment of the invention.

The optical receiver R shown in FIG. 7 is applicable to the first and second optical receivers R1 and R2 present in the previous embodiments of the QKD systems 10. Exemplary, the first receiver R1 is considered here as the optical receiver R receives a receiver input signal 77, which is the output signal 50 of the QKD terminal 1, and the entangled photon 7, both emitted by the QKD terminal 1. The receiver input signal 77 may be a classical communication signal.

The receiver input signal 77 and the entangled photon 7 (or 8) is received by the optical receiver R is first incident on two coarse steering mirrors 70, which are motorized to rotate in two dimensions. The receiver input signal 77 and the entangled photon 7 then propagate through a beam expander 61 onto a deflection element 41. The beam path of the receiver input signal 77 and the entangled photon 7 is then split towards a fiber collimator 74, a position sensitive photodetector 72 and a wavefront sensor 73 by two beam splitters 71. In a further embodiment, separate fiber collimators 74 are provided for the receiver input signal 77 and the entangled photon 7. In a reversed manner as described with relation to FIG. 4, the receiver input signal 77 and the entangled photon 7 are processed by the fiber optical circuit 54 comprising the (de-)multiplexer 55, the optical circulator 56, a detector 52 for the receiver input signal 77 and a QKD detection unit 75 instead of the entangled photon source 2. The QKD detection unit 75 is configured to measure the quantum state of entangled photon 7 and comprises at least one or more photon counters. A receiver output signal 78, which becomes the input signal 53 at the QKD terminal 1, is emitted by the light source 49 connected to the optical circulator 56. The (de-)multiplexer 55 is configured as a wavelength multiplexer. In further embodiments, the multiplexer 55 may be configured as a spatial mode multiplexer.

Based on the measured position on the photodetector 72, the tilt 44 of the deflecting element is corrected by the receiver controller 76. In this way, the pointing of the incoming receiver input signal 77 and the entangled photon 7 is stabilized. Furthermore, the signal from the position sensitive photodetector 72 could be used to control both the fast steering mirror 41 and the coarse pointing mirrors 70. Alternatively, two position sensitive detectors can be implemented, one with smaller field of view (e.g., a quadrant detector) for controlling the fast steering mirror 41, and another one with larger field of view (e.g., a camera) to control the mirrors 70.

The wavefront sensor 73 is configured to measure the wavefront of the output signal 50. The receiver controller 76 is configured to trigger an adaptive optical element (not shown in FIG. 7) to manipulate a wavefront of the received entangled photon 7 such that it can be better coupled into the fiber collimator 74 and better detected in the QKD detection unit 75. At the same time, the receiver input signal 77 can be corrected simultaneously. In this way, the communication channel 51 can be used to analyze the atmospheric turbulences and correspondingly correct the wavefront for both, the communication beams, i.e., for the receiver output signal 78 and receiver input signal 77, and the entangled photon 7 (and 8 at the second receiver R2 respectively). Since this improves the focus of the entangled photon onto the photon counter at the receiver, this aspect leads to a higher key-data rate.

Figure 8:
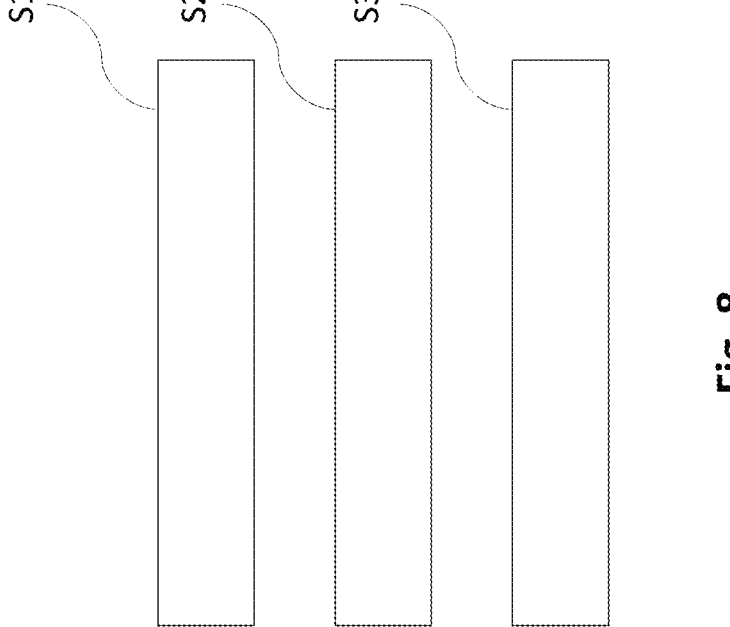
FIG. 8 shows a schematic illustration of a method for quantum communication according to a further embodiment of the invention.

FIG. 8 shows a schematic illustration of a method for quantum communication according to a further embodiment of the invention.

The method for quantum communication comprises the step of generating S1 by an entangled photon source 2, a pair of entangled photons 3. The method comprises the step of directing S2 the pair of entangled photons 3 to a dynamic holographic device 5. Additionally, the method comprises a triggering S3, by a controller 6, of the dynamic holographic device 5 to redirect a first entangled photon 7 of the pair of entangled photons 3 to a first direction D1 and the second entangled photon 8 of the pair of entangled photons 3 to a second direction D2 different from the first direction D1.

The systems and devices described herein may include a controller, such as controller 6, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and exemplary embodiments. Many other examples will be immediately and directly clear to a person skilled in the art on the basis of his knowledge in the art in consideration of the above description.

The exemplary embodiments have been chosen and described in order to be able to present the principles underlying the invention and their application possibilities in practice in the best possible way. As a result, those skilled in the art can optimally modify and utilize the invention and its various exemplary embodiments with regard to the intended purpose of use. In the claims and the description, the terms "including" and "having" are used as neutral linguistic concepts for the corresponding terms "comprising". Furthermore, use of the terms "a", "an" and "one" shall not in principle exclude the plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 QKD terminal
2 entangled photon source
3 pair of entangled photons
4 QKD channel
5 dynamic holographic device
6 controller
7 first entangled pulse
8 second entangled pulse
10 QKD system
30 first meta surface
31 second meta surface
32 incident beam
33 first beam
34 second beam
35 rotational stage
36 substrate
37 thermo-optical substrate
40 pointing system
41 deflecting element
42 beacon detector
43 beacon light
44 tilt of the deflecting element
45 first photodetector
46 first beacon light
47 second photodetector
48 second beacon light 49 light source
50 output signal
51 communication channel
52 detector
53 input signal
54 fiber optical circuit
55 multiplexer
56 optical circulator
57 fiber collimator
58 lens
59 relay lenses
60 dichroic filter
61 beam expander
62 wide angle lens
63 dichroic beam splitter
64 focusing lens
65 drone
66 rotor
67 bottom side of the QKD terminal
68 beacon aperture
69 communication-link aperture
70 coarse steering mirrors
71 beam splitter
72 photodetector
73 wavefront sensor
74 fiber collimator
75 QKD detection unit
76 receiver controller
77 receiver input signal
78 receiver output signal
A optical axis
D1 first direction
D2 second direction
R, R1, R2 receiver
S1-S3 method steps
$\varphi$ rotational angle
$\theta$ angle of arrival of the beacon light

The invention claimed is:

1. A QKD terminal for quantum communication, comprising:
    a photon source configured to emit a pair of entangled photons on a QKD channel on a shared optical axis,
    a dynamic holographic device arranged downstream of the photon source on the QKD channel and configured to receive the pair of entangled photons on the shared optical axis, and redirect the pair of entangled photons; and
    a controller connected to the holographic device and configured to trigger the holographic device to redirect a first entangled photon of the pair of entangled photons to a first direction and a second entangled photon of the pair of entangled photons to a second direction different from the first direction.

2. The QKD terminal according to claim 1, wherein the dynamic holographic device is configured as at least one of a tunable meta surface, a liquid crystal spatial light modulator, or a digital hologram.

3. The QKD terminal according to claim 1,
    wherein the dynamic holographic device comprises a first meta surface and a second meta surface downstream of the first meta surface in the QKD channel,
    wherein the first meta surface is configured as a grating for splitting an incident beam into a first beam and a second beam,
    wherein the second meta surface is configured as a beam steering element, and wherein the controller is configured to trigger the second meta surface to redirect the first entangled photon to the first direction and the second entangled photon to the second direction.

4. The QKD terminal according to claim 3, wherein the first meta surface and the second meta surface are mounted on a rotational stage configured to rotate about an azimuthal direction, and wherein the second meta surface is configured as a one-dimensional beam steering element.

5. The QKD terminal according to claim 3, wherein the first meta surface and the second meta surface are formed on a respective substrate, wherein the controller is configured to trigger at least one of the first meta surface or the second meta surface to deflect the first entangled photon and the second entangled photon by stretching the respective substrate.

6. The QKD terminal according to claim 3, wherein the second meta surface is formed on a thermo-optical substrate, wherein the controller is configured to deflect the first entangled photon and the second entangled photon by applying a temperature to the thermo-optical substrate.

7. The QKD terminal according to claim 1, further comprising a pointing system comprising a deflecting element arranged downstream of the entangled photon source and configured to deflect the pair of entangled photons, and a beacon detector configured to sense an angle of arrival of a beacon light incident to the QKD terminal, wherein the controller is configured to control a tilt of the deflecting element based on the sensed angle of arrival of the beacon light.

8. The QKD terminal according to claim 7, wherein the beacon detector comprises a first photodetector configured to sense a first beacon light having a first wavelength, and a second detector configured to sense a second beacon light having a second wavelength.

9. The QKD terminal according to claim 1, wherein the entangled photon source is implemented on an integrated photonic circuit.

10. The QKD terminal according to claim 1, further comprising a light source arranged and configured to emit an output signal on a communication channel, and a detector arranged and configured to receive an input signal of the optical communication channel, wherein the dynamic holographic device is arranged on the communication channel downstream of the light source and the detector.

11. The QKD terminal according to claim 10, further comprising a fiber optical circuit arranged and configured to couple the pair of entangled photons, the input signal and the output signal into the fiber optical circuit, wherein the fiber optical circuit comprises a multiplexer configured to combine the output signal with the pair of entangled photons.

12. The QKD terminal according to claim 11, wherein the fiber optical circuit comprises an optical circulator arranged and configured to receive the input signal and the output signal and direct the input signal to the detector and the output signal to the multiplexer.

13. A QKD system for quantum communication, comprising:
the QKD terminal according to claim 1,
a first optical receiver, and
a second optical receiver,
wherein the controller is configured to trigger the holographic device to redirect the first entangled photon to the first optical receiver and the second entangled photon to the second optical receiver.

14. The QKD system according to claim 13, wherein at least one of the first optical receiver and the second optical receiver is mounted on a moving vehicle.

15. The QKD system according to claim 13, wherein at least one of the first optical receiver and the second optical receiver is mounted on a moving vehicle, and wherein the QKD terminal is mounted on an unmanned air vehicle or a satellite.

16. The QKD system according to claim 13, wherein the QKD terminal is mounted on an unmanned air vehicle or a satellite.

17. A method for quantum communication, comprising:
generating, by an entangled photon source, a pair of entangled photons;
directing the pair of entangled photons to a dynamic holographic device along a shared optical axis; and
triggering, by a controller, the dynamic holographic device to redirect a first entangled photon of the pair of entangled photons to a first direction and a second entangled photon of the pair of entangled photons to a second direction different from the first direction.

\*    \*    \*    \*    \*